June 4, 1963 R. A. PÂRIS ETAL 3,092,455
PROCESS OF MAKING ALUMINUM NITRIDE
Filed Feb. 11, 1960 2 Sheets-Sheet 1
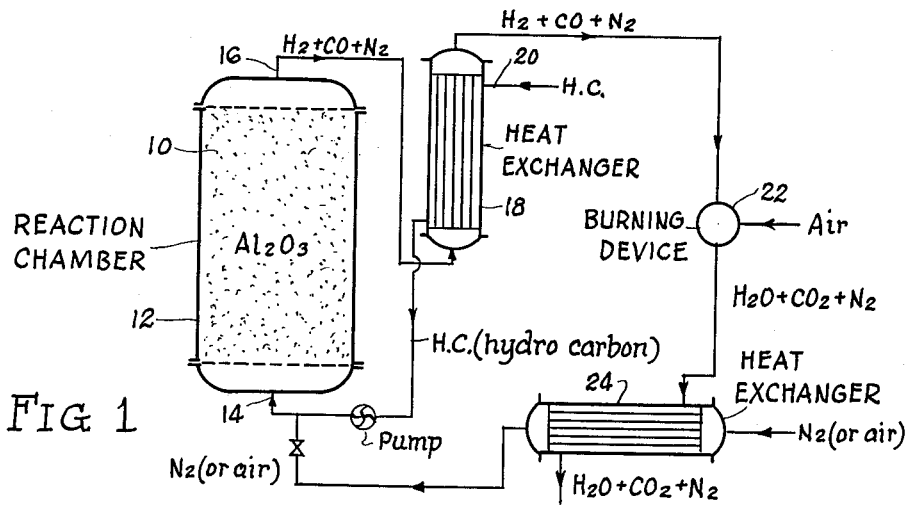
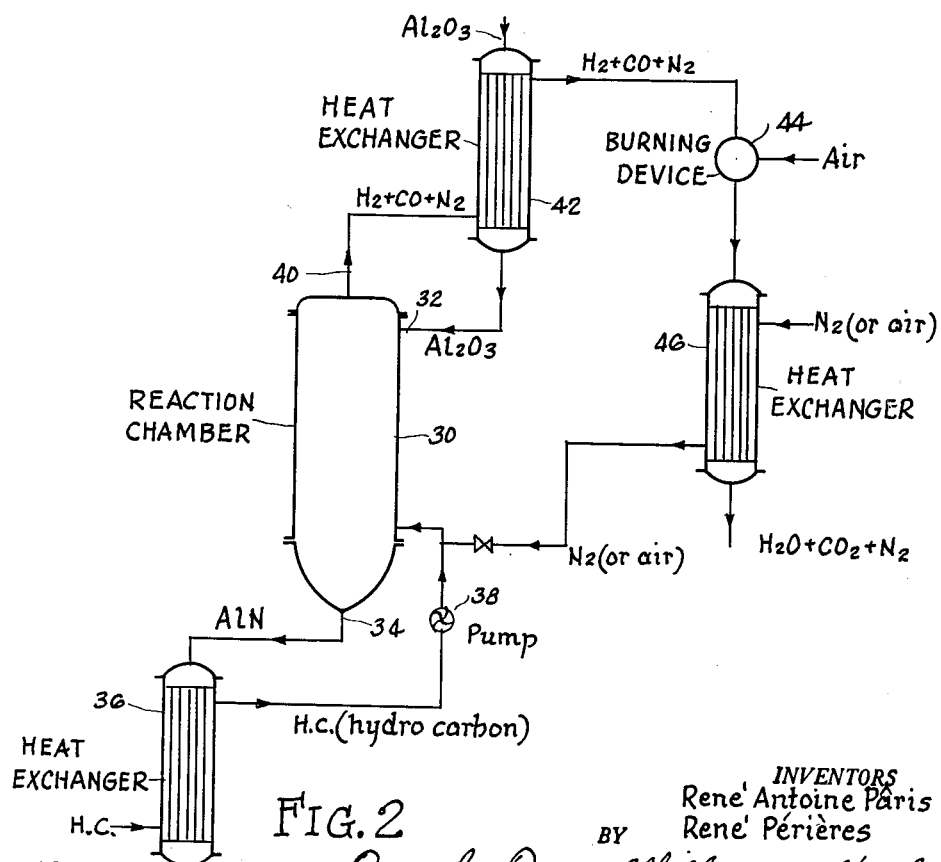
INVENTORS
René Antoine Pâris
René Périères
BY Ooms, McDougall, Williams & Hersh
Attorneys June 4, 1963  R. A. PÂRIS ETAL  3,092,455
PROCESS OF MAKING ALUMINUM NITRIDE
Filed Feb. 11, 1960  2 Sheets-Sheet 2

INVENTORS
René Antoine Pâris
BY René Périères
Oome, McDougall, Williams & Hersh
Attorneys 3,092,455
PROCESS OF MAKING ALUMINUM NITRIDE
René Antoine Pâris, Lyon, and René Périères, La Tronche,
   France, assignors to Pechiney, Paris, France
       Filed Feb. 11, 1960, Ser. No. 8,060
    Claims priority, application France Feb. 13, 1959
              13 Claims. (Cl. 23—192)

This invention relates to the manufacture of aluminum nitride and more particularly to the manufacture of aluminum nitride which is relatively free of impurities.

This invention is an improvement over the process for the manufacture of aluminum nitride from oxide ores of aluminum, as described and claimed in the co-pending application Ser. No. 671,980, filed July 15, 1957, now Patent No. 2,962,359, and which is incorporated herein by reference.

In accordance with the aforementioned copending application, aluminum nitride having less than 3 percent by weight of impurities in the form of aluminum oxide or carbon is prepared by the reaction of aluminum oxide, carbon and nitrogen at temperatures between about 1600° and 1750° C. and preferably at a temperature of the order of 1750° C. in accordance with the following equation, but wherein the carbon and nitrogen components are present in amounts in excess of that which is theoretically required:

(1)       $Al_2O_3 + 3C + N_2 \rightleftarrows 2AlN + 3CO$

In order for the Reaction 1 to proceed most easily, completely and rapidly, it is desirable that the components be brought into reactive contacting relationship one with the others. While such intimate contacting relationship can be easily achieved with any gaseous component, it is more difficult with such materials as are solid in nature such as carbon and aluminum oxide. To the present, use has been made of such techniques as crushing, mixing, kneading, agglomerating and the like, in the attempt to bring the solid components into a desired uniform distribution with the particles in intimate contacting relation. Even then, the desired reactive relationship is not complete such that components remain unreacted in the final product whereby the amounts of impurities and unreacted materials remain excessive. For use in the manufacture of aluminum metal from such aluminum nitride, it is desirable to have available an aluminum nitride which contains a minimum amount, such as less than 3 percent by weight, of unreacted aluminum oxide or other impurities, otherwise the separation of aluminum becomes more difficult and the yield of aluminum will be found to be quite low.

It is an object of this invention to produce and to provide a method for producing aluminum nitride which is substantially free of impurities and unreacted components and it is a related object to provide a method for producing a high yield of relatively pure aluminum nitride by a thermal reaction with the oxide ores of aluminum.

Another object is to provide a method for the production of aluminum nitride by reaction of aluminum oxide with a reducing agent and nitrogen wherein an intimate reactive relationship is established between the components for rapid and complete reaction to form aluminum nitride having less than 3 percent by weight of unreacted components or impurities.

These and other objects and advantages of this invention will hereinafter appear and for purposes of illustration, but not of limitation, embodiments of the invention are shown in the accompanying drawings in which—

FIG. 1 is a schematic flow diagram of one process for use in the practice of this invention;

FIG. 2 is a schematic flow diagram of a modified process for the manufacture of aluminum nitride in accordance with the practice of this invention;

Figure 3:
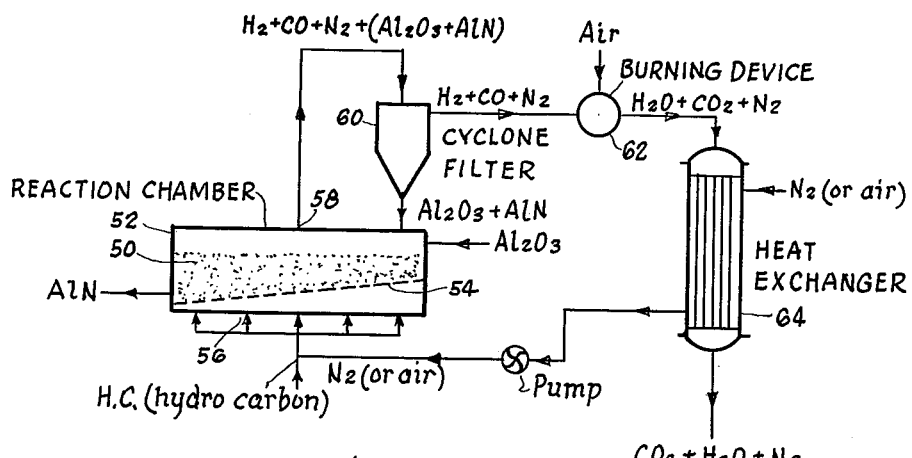
FIG. 3 is a schematic flow diagram of another modification.

In accordance with the practice of this invention, aluminum nitride in relatively high yields and relatively high purity is produced by reaction of aluminum oxide, nitrogen and hydrocarbon at a temperature in excess of 1200° C. but below 1750° C. whereby the hydrocarbon is cracked in the presence of the aluminum oxide to make available elemental carbon in a most reactive state in uniform distribution throughout the aluminum oxide and in intimate contacting relationship for reaction therewith while either concurrently or subsequently thereto, the nitrogen, available in gaseous form for uniform distribution in intimate contacting relationship with the other components reacts with the aluminum oxide and reducing carbon to produce the aluminum nitride. Thermal cracking of the hydrocarbon, especially in the presence of aluminum oxide particles, commences fairly rapidly at temperatures in excess of 1200° C. and will continue even more rapidly at the higher temperatures up to 1700° C. which are preferred for reaction of the nitrogen in the presence of the aluminum oxide and carbon to produce aluminum nitride. At these temperatures, the hydrocarbon is available in a vaporous form whereby the hydrocarbon is capable of full and complete penetration of the aluminum oxide particles for uniform distribution therewith whereby, upon cracking, carbon is deposited in intimate contacting relationship throughout the cross-section of the aluminum oxide. Similarly, because the nitrogen is available for reaction while in a gaseous state, uniform and complete distribution in intimate contacting relationship with the solid components is again automatically achieved for enabling easy, quick and complete reaction to produce aluminum nitride in high yields from the ingredients without excessive amounts of unreacted components remaining, other than such excesses of carbon and nitrogen which are intentionally incorporated to provide for the more complete conversion of the aluminum oxide. Such excesses are capable of elimination from the product, as will hereinafter be pointed out.

As stated, aluminum nitride is obtained directly by thermal cracking of hydrocarbons in contact with the solid particles of aluminum oxide at a temperature of about 1200° C. and by reacting nitrogen therewith at a temperature below 1750° C. but preferably above 1400° C. and more preferably above 1600° C. in accordance with the following equation:

(2)

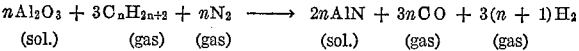

However, as described in the aforementioned copending application, it is expedient to operate with an amount of nitrogen in excess of that theoretically required in accordance with Equation 2. This means that more than one molecule of nitrogen is employed per 3 atoms of carbon produced by the cracking of the hydrocarbon for reaction with the aluminum oxide. Thus one can set forth the equation as follows:

(3)

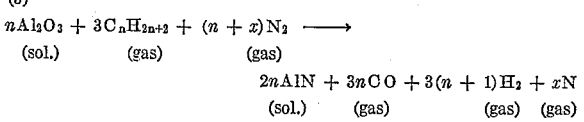

The quantity of hydrocarbons introduced in said chamber for a given mass of aluminum oxide is calculated in such a way that the total number of carbon atoms obtained by cracking will be at least equal to or even higher than three times the number of molecules of aluminum oxide particles. Since the volume and analytical composition of the treated hydrocarbons is known, the number of carbon atoms is readily measurable and it may further be determined, for example, by quantitative analysis, among other things, of the number of hydrogen atoms contained in the gases issuing from the reaction chamber, taking into consideration the amount of free carbon which may be drawn along or entrained with said gases.

According to the preferred practice of the invention, use is made of saturated aliphatic hydrocarbons having less than 4 carbon atoms, such, for example, as propane, ethane, and more especially methane, in order to produce by cracking, on the one hand, reducing carbon, and, on the other hand, hydrogen in accordance with the following reaction $CH_4 \rightarrow C + H_2$. By using such hydrocarbons, and especially such hydrocarbons containing a high percentage of methane, it is possible effectively to prevent the formation of lighter hydrocarbons upon cracking which would, on the one hand, limit the formation of reducing carbon, and, on the other hand, contaminate the recovered gaseous mixture.

The normally gaseous or liquid hydrocarbons can be introduced into the apparatus for effecting contact with the aluminum oxide either while cold or preferably preheated. The hydrocarbons may even be preheated to a temperature in the vicinity of and slightly below the temperature at which the cracking of the hydrocarbons begins to take place. The hydrocarbons can be introduced into the apparatus for reaction, either pure or in admixture with the amount of nitrogen required for the reaction for producing aluminum nitride as the final product.

In accordance with a non-limiting embodiment of this invention, the hydrocarbon can be cracked directly in contact with the aluminum oxide at a temperature corresponding substantially to that of the reaction with nitrogen to form the aluminum nitride in the presence of reducing carbon, that is to say, at a temperature less than 1750° C. Thus, the two steps of cracking the hydrocarbons and nitriding by means of nitrogen and aluminum oxide in the presence of carbon may be carried out simultaneously in a single operation or they may be carried out sequentially in the same apparatus or in separate apparatus. Instead, the hydrocarbons can be cracked in the presence of aluminum oxide in one apparatus to produce aluminum oxide having the desired amount of carbon in intimate contact and in uniform distribution throughout the cross-section thereof and thereafter the aluminum oxide with the carbon in intimate contact with the surfaces thereof can be reacted in the presence of nitrogen in another chamber at a temperature most suitable for the reaction, such as at a temperature of 1400–1750° C. and preferably at a temperature between 1600° and 1750° C.

In accordance with another concept of this invention, air, with or without enrichment with water vapor or hydrogen, eventually in excess, can be admixed with the hydrocarbon for partial combustion thereof to produce all or a part of the heat required for the nitriding or the cracking or both reactions. However, the amount of oxygen introduced into the system should be calculated to leave an amount of carbon sufficient for combination with the aluminum oxide and nitrogen to produce the desired reaction for the production of aluminum nitride. The combustion process of methane, for example, in the presence of air, in accordance with the schema:

(4) $\qquad CH_4 + \tfrac{1}{2}O_2 + 2N_2 \rightarrow CO + 2N_2 + 2H_2$ is such that it will be able thermally to balance cracking and nitriding endothermal reactions as follows:

(5) $\qquad Al_2O_3 + 3CH_4 + N_2 \rightarrow 2AlN + 3CO + 6H_2$

Further, the gaseous nitrogen obtained in the course of the combustion Reaction 4 is capable of use in the nitriding reaction at the treatment temperature of aluminum oxide, in accordance with the practice of this invention.

In practice, the gaseous exhaust from the reaction chamber, which will be found to contain combustible materials, can be burned to produce additional heat which can be supplied indirectly to the mass which is subjected to the reaction and/or to the nitrogen, hydrocarbon, air or aluminum oxide, as by means of heat exchangers, concurrently with or prior to reaction.

The exact values for the minimum rate of nitrogen flow depend upon various factors and, in particular on the carbon reactivity of the charge and the degree of uniformity of the flooding of the charge with nitrogen and the temperature distribution in the furnace. The optimum rate of nitrogen flow can be easily determined experimentally by an analysis of the waste gases escaping from the furnace. The nitrogen rate of flow at the inlet should be sufficiently high to provide that the nitrogen content of the waste gases exhausted from the outlet will exceed the value corresponding to the equilibrium at the lowest temperature of the entire nitriding zone.

The porosity of the aluminum oxide should be sufficient to let nitrogen penetrate into the interior thereof in order to expose the entire cross-section of the aluminum oxide to reaction with the nitrogen and carbon. For this purpose, it is desirable to make use of a type of porous aluminum oxide such as is manufactured in accordance with the teachings of the copending application Ser. No. 759,391, filed September 8, 1958, and now abandoned.

In industrial practice, it is preferred to increase the stoichiometric or thermodynamic proportions of certain of the components which are otherwise capable of elimination in order to drive the reaction in the direction for most complete utilization of the components which are either more expensive or else constitute impurities in the final product which raise problems of elimination. Thus it is desirable to make use of excesses of nitrogen and carbon for more complete utilization of the aluminum oxide.

However, in the present case, the excess of carbon is not added solely for the purposes previously pointed out to exceed the stoichiometric proportions in the equation:

(1) $\qquad Al_2O_3 + 3C + N_2 \rightarrow 2AlN + 3CO$ for this equilibrium. The equation does not take into account losses which are due to the parallel reaction $$AlN + C \rightleftharpoons AlCN \text{ (gas)}$$

which phenomenon of a secondary reaction is described in the aforementioned copending application.

It will be clear from the above explanations that the amount of carbon should be greater than the amount theoretically required to reduce alumina with carbon and nitrogen and we prefer to make use of an amount of carbon in excess of the amount theoretically required by the aforesaid nitriding of aluminum oxide plus the replacement of the loss of carbon due to AlCN formation. The excess carbon available in the final product can be reduced in a subsequent step of the process as through a mild combustion treatment. Thereby, excess carbon is burned and escapes from the aluminum nitride product. Aluminum nitride is not liable to become oxidized by air or oxygen when exposed to temperatures slightly about 800° C. Consequently, the excess carbon remaining in the product of aluminum nitride can be substantially completely and safely removed by burning at temperatures within the range of 600° to 800° C.

The process of this invention may be carried out in various ways which will hereinafter be identified as a fixed bed, or a moving bed, or a fluid bed, in either continuous or batch operation.

In the fixed bed system, illustrated diagrammatically in FIG. 1, the aluminum oxide 10 in the form of hollow porous particles of from 2 to 20 millimeters in cross-section are placed in a reaction chamber 12 lined with a suitable refractory material, such as graphite or other refractory which is resistant to corrosion by aluminum nitride and resistant to reaction with nitrogen at the temperature conditions existing. Instead of graphite, use, for example, can be made of pure aluminum nitride or aluminum oxide.

The bulk of the aluminum oxide is heated, directly or indirectly, by suitable well known means, to the desired temperature for hydrocarbon cracking and/or for reaction of the aluminum oxide, carbon and nitrogen to form aluminum nitride. Thus for cracking, the bulk of the aluminum oxide may be, at least in the cracking zone, heated to a temperature above about 1100° C. and preferably to a temperature within the range of 1200–1400° C. and in the range of 1400–1750° C. when the cracking reactions are carried out simultaneously with aluminum nitride formation. For nitriding, the nitriding zone, which may be in common with or consecutive to the cracking zone, is brought to a temperature of 1400–1750° C. and preferably to a temperature of 1600–1750° C.

While the bulk of the aluminum oxide is thus heated to the desired temperature, the hydrocarbon to be cracked and the nitrogen (with or without air) are introduced into the chamber 12 through the inlet 14, either together or first the hydrocarbon and then the nitrogen. These materials are preferably introduced at a velocity such that, on the one hand, as complete cracking of the hydrocarbon as possible is obtained in the presence of the heated particles of aluminum oxide and, on the other hand, the nitriding reaction between nitrogen, aluminum oxide and reducing carbon proceeds with high nitride yields. The gases exhausted from the chamber through the vent 16 can be released into the atmosphere but it is preferred to recover heat therefrom as by passing the exhaust gases through the exchanger 18 in heat exchange relationship with the hydrocarbon to preheat the hydrocarbon introduced through line 20. The exhaust which contains combustible materials such as carbon monoxide and hydrogen may subsequently be burned in the burner 22 to produce heat which is recovered by passage of the burned gases through the exchanger 24 in heat exchange relationship with nitrogen and/or air prior to introduction into the chamber. The nitrogen (air) and hydrocarbon may be interchanged in the preheaters if desired.

The required amount of heat is supplied by any heating or thermal exchange procedure, direct or indirect, and among other things, as has been described above.

In the moving bed system, illustrated in the flow diagram of FIG. 2, the aluminum oxide, preferably in the form of hollow particles of about 20 millimeters or less in cross-section, is continuously introduced into a reaction chamber 30 lined with a suitable refractory material. The aluminum oxide particles are brought to the desired temperature for cracking and/or nitriding. The heated particles of aluminum oxide are advanced, as by gravity, from the inlet 32 at the top to the outlet 34 at the bottom, and while passing through the chamber the particles are exposed to the hydrocarbon vapors and the nitrogen vapors to produce the aluminum nitride which is extracted as a product from the outlet 34.

In the reaction chamber, the gaseous hydrocarbon may be introduced with the aluminum oxide, at the same or from opposite ends of the chamber for parallel or countercurrent flow respectively, whereby reaction to crack the hydrocarbon and provide carbon in situ on the aluminum oxide particles and nitriding to form aluminum nitride by reaction of the aluminum oxide and nitrogen in the presence of reducing carbon occurs during contact between the ingredients and the fluid stream, while the aluminum oxide is in the chamber.

Again, the heat from the materials exhausted from the chamber may be recovered. The aluminum nitride product, extracted from the bottom of the chamber, can be passed through the exchanger 36 in heat exchange relationship with the hydrocarbon to preheat the hydrocarbon introduced in controlled amounts by the valve 38 into the chamber. The exhaust gases vented from the chamber through line 40 can be passed through the exchanger 42 in heat exchange relationship with the aluminum oxide introduced at the one end of the chamber. The combustible components of the exhaust can be burned in the burner 44 and then passed through the heat exchanger 46 in heat exchange relationship with the nitrogen or air thereby to preheat the various ingredients which are fed into the reaction chamber.

In the fluid bed system, illustrated in FIG. 3, the aluminum oxide 50 in the form of fine particles preferably less than 1 millimeter in cross-section, is introduced at one end of an insulated chamber 52 onto one or more porous supporting shelves or surfaces 54 over which the particles are continuously moved as a fluid bed to the outlet end of the chamber at the opposite end of the support. The particles of aluminum oxide are heated in the chamber by suitable direct or indirect heating means to the desired temperature for cracking the hydrocarbon and for reaction between the aluminum oxide and reducing carbon to produce aluminum nitride. While in the form of the fluid bed, the heated aluminum oxide particles are subjected to a cross-current of hydrocarbon vapors and nitrogen introduced through numerous inlets 56 across the bottom side of the chamber for passage of gases and vapors upwardly through the fluid bed for reaction with the aluminum oxide particles. The gaseous products are exhausted from the top of the chamber through the outlet 58.

This type of system is subject to division into one zone for hydrocarbon cracking and a subsequent zone for nitriding. For this purpose, the chamber 52 may be subdivided into a leading section into which the hydrocarbon vapors are introduced for cracking to release carbon in a finely divided reactive state throughout the cross-section of the aluminum oxide whereby the aluminum oxide having the particles of carbon thereon are first produced for continuous advancement into the subsequent nitriding zone wherein nitrogen is introduced for reaction with the aluminum oxide and carbon. The cracking section can thus be heated to a temperature of 1100–1400° C. while the nitriding zone can be heated to a tempearture of 1400–1750° C. and preferably 1600–1750° C., or both zones may be heated to the temperature most desirable for nitriding.

Since some solid aluminum oxide will be entrained in the current of the exhaust gases, it is expedient to pass the exhaust through a separator such as a cyclone 60 to remove the solid particles of aluminum oxide, aluminum oxide having carbon on the surfaces thereof, and aluminum nitride, all of which may be recycled to form a part of the feed. The separated gases containing combustible components can be burned in the burning device 62 and then passed through the heat exchanger 64 in heat exchange relationship with nitrogen or hydrocarbon for preheating the same before introducing into the furnace.

Figure 4:
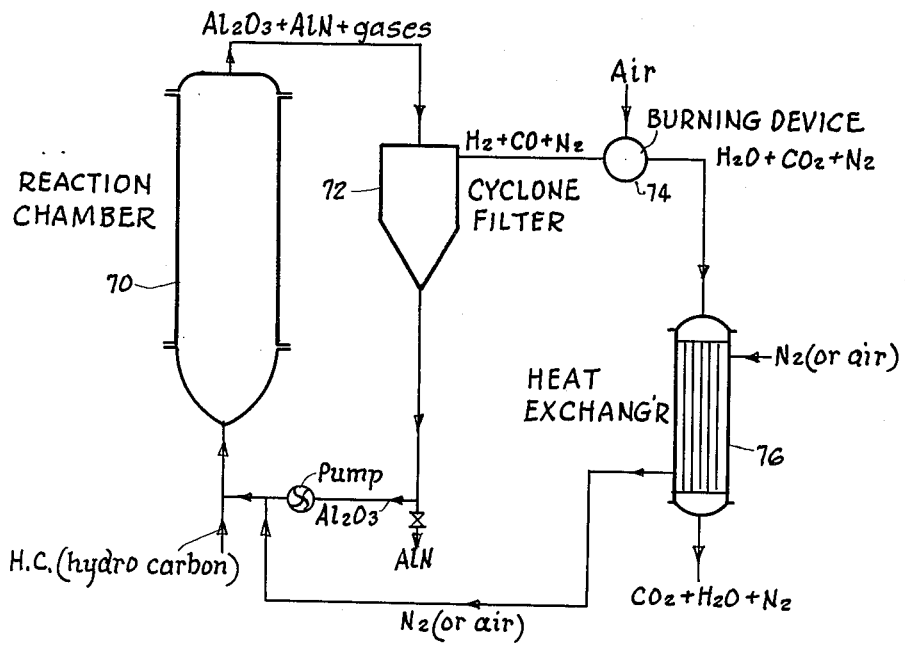
FIG. 4 is a schematic flow diagram of a still further modification.

The fluid bed system of a modified form is illustrated also in the flow diagram of FIG. 4. In this system, the aluminum oxide particles in finely divided form are suspended in an ascending current of hydrocarbon vapor and/or nitrogen (air). The moving particles of heated aluminum oxide are brought into contact with the hydrocarbon vapors for cracking to deposit reduced carbon in intimate contact and in uniform distribution on the surfaces of the aluminum oxide and the aluminum oxide-carbon is concurrently or subsequently engaged by the nitrogen for thermal reaction to produce aluminum nitride. The mass of entrained aluminum nitride plus other solids will be carried by the gases or vapors from the heated reaction chamber 70 to a separator 72 in the form of a cyclone wherein the solid particles are separated from the gaseous remainder. The solids can be recycled in whole or in part through the chamber 70 until the conversion of the aluminum oxide to aluminum nitride is substantially completed. Instead, all but a small fraction of the separated solids may be recycled through the chamber for continued reaction while the remainder may be removed as product. The gaseous remainder will still contain combustible materials which can be burned in the burner 74 to generate heat which is recovered by passage of the exhaust through the exchanger 76 in heat exchange relationship with nitrogen and/or hydrocarbon fed into the chamber 70.

According to these techniques, the amount of calories required, either for heating the bulk of the aluminum oxide or for carrying out the cracking and/or nitriding reactions, is supplied by any suitable heating means or thermal exchange procedure, direct or indirect, such as those which are described above.

The following will illustrate the practice of this invention:

*Example 1*

Through the top side of a furnace which is heat insulated and equipped with one or more vertically disposed reaction chambers lined with pure aluminum oxide and/or graphite refractory materials, and uniformly heated to a temperature less than 1750° C. but above 1100–1200° C. by an electrical resistance heating system, there is continuously introduced aluminum oxide in the form of porous grains of corundum having a dimension of about 3 to 5 millimeters in cross-section. The aluminum oxide may have been previously partially heated, as previously described, as by heat exchange with the hot exhaust gases issuing from the furnace.

In the central or lower portions of the furnace, there is introduced natural gas which has been preferably, though not essentially, preheated as previously described and which has an analysis as follows:

|  | Percent by weight |
|---|---|
| Methane | 92.5 |
| Ethane | 6.5 |
| Propane | 0.8 |
| Butane | 0.2 |

When the natural gas vapors are heated in the furnace to the elevated temperature of the corundum grains, the hydrocarbon will crack in the presence of the heated corundum to release carbon and hydrogen whereby the carbon deposits in uniform distribution and reactive condition throughout the cross-section of the aluminum oxide grains.

Simultaneously with the introduction of natural gas, nitrogen is introduced into the bottom side of the furnace for reaction with the mixture of aluminum oxide and reducing carbon in accordance with the Equation 5. At the bottom of the reaction chamber (or chambers), the grains consisting essentially of aluminum nitride will be regularly collected for removal from the furnace.

It will be understood that changes may be made in the details of construction, arrangement and operation as well as in the reactive conditions within the limitations described, without departing from the spirit of the invention, especially as defined in the following claims.

We claim:

1. A process of making aluminum nitride comprising the steps of contacting aluminum oxide with a natural gas formed of hydrocarbons containing from 1 to 4 carbon atoms and in an amount to provide at least 3 atoms of carbon per molecule of $Al_2O_3$ and heating the materials to a temperature within the range of 1200° C. to 1750° C. whereby hydrocarbon is dissociated to form hydrogen which goes off as a gas and carbon which is retained by the aluminum oxide, introducing nitrogen into contact with the aluminum oxide-carbon in an amount corresponding to at least one mol of $N_2$ per mol of $Al_2O_3$, and heating to a temperature within the range of 1200° C. to 1750° C. to produce CO which goes off as a gas and AlN which is retained as a product.

2. A process in accordance with claim 1 wherein the hydrocarbon gas and nitrogen are simultaneously brought into contacting relationship with the aluminum oxide for reaction.

3. A process in accordance with claim 1 wherein the aluminum oxide is in the form of hollow particles consisting essentially of blown corundum.

4. A process in accordance with claim 1 wherein air is added in combination with the hydrocarbon.

5. A process in accordance with claim 4 wherein the amount of air incorporated with the hydrocarbon corresponds to at least the amount of nitrogen required for the nitriding reaction of aluminum oxide in the presence of carbon plus the quantity of heat evolved by the exothermal combustion of the hydrocarbon with air according to the scheme:

$$CH_4 + \tfrac{1}{2} O_2 + 2N_2 \rightarrow CO + 2N_2 + 2H_2$$

and being at least equal to the quantities of heat required for the entire cracking and nitriding endothermal reactions in accordance with the equation:

$$Al_2O_3 + 3CH_4 + N_2 \rightarrow 2AlN + 3CO + 6H_2$$

6. A process in accordance with claim 1 wherein the cracking of the hydrocarbon and the nitriding of the aluminum oxide and carbon is conducted with the aluminum oxide in a fixed stationary bed.

7. A process in accordance with claim 1 wherein in the cracking of the hydrocarbon and the nitriding of the aluminum oxide, the aluminum oxide is advanced in counter-current flow with respect to the hydrocarbon gases and the nitrogen gas.

8. A process in accordance with claim 1 wherein in the cracking of the hydrocarbon and the nitriding of the aluminum oxide and carbon, the aluminum oxide is advanced in continuous flow in the same direction with the hydrocarbon gases and the nitrogen gas.

9. A process in accordance with claim 1 wherein in the cracking of the hydrocarbon and the nitriding of the aluminum oxide and carbon, the aluminum oxide is moved in a continuous fluid bed across the path of travel of the hydrocarbon vapors and the nitrogen gas whereby the latter are caused to pass therethrough for reaction.

10. A process of making aluminum nitride comprising the steps of contacting aluminum oxide with methane in an amount corresponding to at least 3 mols of methane per mol of $Al_2O_3$ and heating the materials in combination to a temperature within the range of 1200° C. to 1750° C. whereby methane dissociates to form hydrogen which goes off as a gas and carbon which is retained by the aluminum oxide, introducing nitrogen into contact with the aluminum oxide-carbon in an amount corresponding to at least 1 mol $N_2$ per mol of $Al_2O_3$ and heating to a temperature within the range of 1200° C. to 1750° C. to produce CO which goes off as a gas and AlN which remains as a product.

11. A process for producing aluminum nitride comprising the steps of heating grains consisting essentially of aluminum oxide to a temperature between 1100° C. and 1750° C., separately contacting the grains of $Al_2O_3$ with a natural gas formed of hydrocarbons containing from 1 to 4 carbon atoms and in an amount to provide at least 3 carbon atoms per mol of $Al_2O_3$ and then with nitrogen gas in an amount of at least 1 mol $N_2$ per mol of $Al_2O_3$ to produce AlN which remains as a solid and CO and $H_2$ which go off as a gas.

12. A process according to claim 11 including the step of adding air in combination with the hydrocarbon.

13. A process for producing aluminum nitride comprising the steps of heating grains consisting essentially of aluminum oxide to a temperature between 1100° C. and 1750° C., separately contacting the heated grains of $Al_2O_3$ with methane in an amount to correspond to at least 3 mols of methane per mol of $Al_2O_3$ and then with nitrogen gas in an amount of at least 1 mol of $N_2$ per mol of $Al_2O_3$ to produce AlN which remains as a solid and CO and $H_2$ which go off as a gas.

References Cited in the file of this patent

UNITED STATES PATENTS

| | | |
|---|---|---|
| 1,030,929 | Sherpek | July 2, 1912 |
| 1,143,482 | Badin | June 15, 1915 |
| 1,145,747 | Bunet | July 6, 1915 |
| 1,188,770 | Hershman | June 27, 1916 |